US007950800B2

(12) United States Patent
Nauche et al.

(10) Patent No.: US 7,950,800 B2
(45) Date of Patent: May 31, 2011

(54) METHOD OF MEASURING AT LEAST ONE GEOMETRICO-PHYSIOGNOMIC PARAMETER FOR POSITIONING A VISION CORRECTING EYEGLASS FRAME ON THE FACE OF A WEARER

(75) Inventors: Michel Nauche, Charenton le Pont (FR); Jean-Pierre Chauveau, Charenton le Pont (FR); Konogan Baranton, Charenton le Pont (FR); Sebastien Evain, Antony (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 0 days.

(21) Appl. No.: 12/596,351

(22) PCT Filed: Feb. 29, 2008

(86) PCT No.: PCT/FR2008/000268
§ 371 (c)(1),
(2), (4) Date: Apr. 8, 2010

(87) PCT Pub. No.: WO2008/129168
PCT Pub. Date: Oct. 30, 2008

(65) Prior Publication Data
US 2010/0195045 A1    Aug. 5, 2010

(30) Foreign Application Priority Data

Apr. 18, 2007   (FR) ..................................... 07 02800
Jun. 20, 2007   (FR) ..................................... 07 04406

(51) Int. Cl.
*A61B 3/10*   (2006.01)

(52) U.S. Cl. ...................................................... 351/204
(58) Field of Classification Search .................. 351/204, 351/246, 245, 200
See application file for complete search history.

(56) References Cited

U.S. PATENT DOCUMENTS 5,617,155 A     4/1997   Ducarouge et al.
7,384,147 B1 *  6/2008   Ameri ........................... 351/245

FOREIGN PATENT DOCUMENTS

| DE | 10 2004 063 160 | 7/2006 |
| FR | 2 719 463 | 11/1995 |
| FR | 2 860 887 | 4/2005 |
| WO | 2007/036288 | 4/2007 |

OTHER PUBLICATIONS

International Search Report dated Sep. 2, 2008, from corresponding PCT application.

* cited by examiner

*Primary Examiner* — Hung X Dang
(74) *Attorney, Agent, or Firm* — Young & Thompson

(57)   ABSTRACT

A method of capturing a substantially front-view image of the face of a wearer wearing at least one frame (10), the image being captured by an image-capture appliance (1), and calculating the geometrico-physiognomic parameter (H, TETA) by processing the captured image. The calculation of the geometrico-physiognomic parameter (H, TETA) includes identifying in the image the image of a predetermined remarkable point (RC) that is directly or indirectly associated with the wearer's face or with the frame, and it takes into consideration a magnitude representative of the absolute vertical angle of observation (GAMMA) formed between firstly an observation line (DO) connecting the pupil (7) of the image-capture appliance (1) to the remarkable point (RC), and secondly its projection onto a horizontal plane (PF).

12 Claims, 7 Drawing Sheets

METHOD OF MEASURING AT LEAST ONE GEOMETRICO-PHYSIOGNOMIC PARAMETER FOR POSITIONING A VISION CORRECTING EYEGLASS FRAME ON THE FACE OF A WEARER

TECHNICAL FIELD TO WHICH THE INVENTION RELATES

The present invention relates in general to preparing vision-correcting eyeglasses, and more precisely to the geometrico-physiognomic measurements that are performed by an optician on the wearer wearing selected frames in order to determine data relating to the configuration with which corrective lenses are to be positioned in front of the wearer's eyes. This data is typically used for the purpose of mounting corrective lenses on the frame, and in particular for ensuring the lenses are optically centered relative to the wearer's eyes, and/or for personalized optical design of the corrective lenses.

TECHNOLOGICAL BACKGROUND

The preparation of a corrective lens for eyeglasses comprises firstly optically designing and then producing the refractive faces of the lens, and secondly adapting the lens to the selected frame. The present invention relates to measuring geometrico-physiognomic parameters on the wearer's face to provide information about the configuration in which the eyeglasses are to be placed on the wearer's face. These parameters can then be used in both of the stages in preparing a corrective lens so as to ensure that the lens ends up performing the corrective optical function for which it was designed and prescribed. In practice, the parameters concerned are mainly the following, considered when the wearer is in an orthostatic posture looking at the horizon at infinity:

the pupillary half-distances, i.e. the horizontal distances between the pupils and the sagittal plane;

the pupil heights, i.e. the substantially vertical distances between the projections of the pupils along the primary gaze axis (at infinity) onto the lens, either relative to the bottom edge of the frame or of the shaped lens (so-called "datum" definition), or else relative to the tangent to said edge at its lowest point (so-called "boxing" definition);

the distance between each lens and the corresponding eye; and the pantoscopic angle of inclination formed by the general plane of the frame or of the lens relative to the vertical.

In order to be taken effectively into account, these parameters need to be measured with care and accuracy, and that can be difficult in practice. In order to rationalize the taking of such measurements, proposals have been made to take the measurements from digital photographs of the wearer's face wearing the frame. Thus, by way of example, the pupillary half-distances and the pupil heights are measured by processing a digital image of the wearer's face taken in front view. In order to obtain the desired measurement accuracy, it has in the past been considered as essential for the image-capture appliance to be mounted to move vertically on a column of a stand that ensures that the optical axis of the lens of the image-capture appliance remains horizontal and can be adjusted to the appropriate height. That is intended to avoid vertical parallax errors that would otherwise run the risk of being made, in particular when measuring eye heights.

Nevertheless, the resulting measurement-taking device turns out to be relatively bulky and not very ergonomic for use on sales' premises. Furthermore, the measurement-taking protocol is perceived as being relatively constraining, lengthy, and painstaking both by the wearer and by the optician.

OBJECT OF THE INVENTION

The object of the present invention is to remedy the above-mentioned drawbacks in full or in part by proposing a front-view image-capture measurement method that can be implemented with a measurement-taking protocol that is fast and flexible using a hand-held image-capture appliance without a stand or column, while nevertheless preserving a high degree of measurement accuracy.

To this end, the invention provides a method of measuring at least one geometrico-physiognomic parameter for positioning a vision-correcting eyeglass frame on the face of a wearer for personalized calculation and/or mounting of corrective lenses associated with said frame, including a step of using an image-capture appliance to capture a digital image substantially in front view of the wearer's face wearing at least the frame, and a step of calculating the geometrico-physiognomic parameter by processing the captured image, the method being characterized in that the calculation of the geometrico-physiognomic parameter includes identifying in the image the image of a predetermined remarkable point that is directly or indirectly associated with the wearer's face or with the frame, and it takes into consideration a magnitude representative of the absolute vertical angle of observation formed between firstly an observation line connecting the pupil of the image-capture appliance to the remarkable point, and secondly, its projection onto a horizontal plane.

Image capture can thus be performed in a configuration of imperfect alignment or front-view registration, i.e. the image-capture appliance may be offset vertically relative to the wearer's face. The error induced by the viewing angle, or vertical parallax, is corrected during the calculation by taking account directly or indirectly of the absolute vertical observation angle, which, in particular, constitutes the source of this error. By means of this correction, it is possible to make the image-capture protocol more flexible and faster, while nevertheless preserving, or even improving, the overall accuracy of the measurement.

The geometrico-physiognomic parameter typically includes the height of a remarkable point of the eye relative to the frame and/or the pantoscopic angle of inclination formed between the vertical and the general plane of the frame or of the lens.

Advantageously, the image-capture appliance is a hand-held appliance held by an operator during image capture. This considerably improves the convenience and the ergonomics of taking the measurements.

In an advantageous embodiment, in order to measure the absolute vertical angle of observation, a tilt angle is measured as formed between the optical axis of the image-capture appliance and its projection on the horizontal plane.

By way of example, the measurement of the tilt angle is provided by a tilt meter fitted to the image-capture appliance and adapted to deliver a signal representative of the value taken by the tilt angle at the moment of image capture.

Alternatively, it is possible to proceed as follows. Prior to image capture, an artificial horizon device is fitted to the wearer's head, the device including a horizon-reference element that is movable in rotation about an axis perpendicular to the sagittal plane and that is adapted to conserve a constant position relative to the horizontal plane, said horizon-reference element having a known geometrical characteristic. After image capture, the image of said horizon-reference element is identified in the captured image, a geometrical characteristic of the image corresponding to the known geometrical characteristic of said horizon-reference element is measured, and the tilt angle is calculated as a function of the measured geometrical characteristic of the captured image and of the known geometrical characteristic of the horizon-reference element.

Under such circumstances, and advantageously, the calculation of the tilt angle is also a function of a reference relative observation angle formed between firstly an observation line passing through a point of the horizon-reference element and the pupil of the image-capture appliance, and secondly the optical axis of the image-capture appliance, said relative observation angle being deduced from the measurement of the off-center shift of the image in the captured image of the horizon-reference element relative to an image center associated with the optical axis of the image-capture appliance.

By way of example, in order to measure the absolute vertical observation angle, it is possible to combine the tilt angle with a relative observation angle formed between the observation line and the optical axis of the image-capture appliance. Said relative observation angle is deduced from measuring the off-center shift in the captured image of the image of the remarkable point of the eye relative to an image center associated with the optical axis of the image-capture appliance.

Alternatively, in order to measure the absolute vertical observation angle, arrangements may be made such that while capturing the image, the image-capture appliance is oriented so that the remarkable point is centered on a centering mark of the viewfinder system of the image-capture appliance. The optical axis of the image-capture appliance then coincides with the observation line, such that the absolute vertical observation angle is then equal to the tilt angle.

In a variant, in order to measure the absolute vertical observation angle, it is also possible to measure an altitude of the image-capture appliance, at least relative to the wearer's head.

According to a particularly advantageous aspect of the invention, a pantoscopic position-identification element is placed on the frame, which element possesses at least one known geometrical characteristic and is placed in such a manner that the front-view image captured by means of the image-capture appliance incorporates an image of the pantoscopic position-identification element. With the image of the position-identification element being processed to measure therefrom a geometrical characteristic depending on the known geometrical characteristic, the calculation of the geometrico-physiognomic parameter is a function of the measured geometrical characteristic and of the known geometrical characteristic of the position-identification element.

DETAILED DESCRIPTION OF AN IMPLEMENTATION

The following description with reference to the accompanying drawings given by way of non-limiting example makes it clear what the invention consists in and how it can be reduced to practice.

Figure 3:
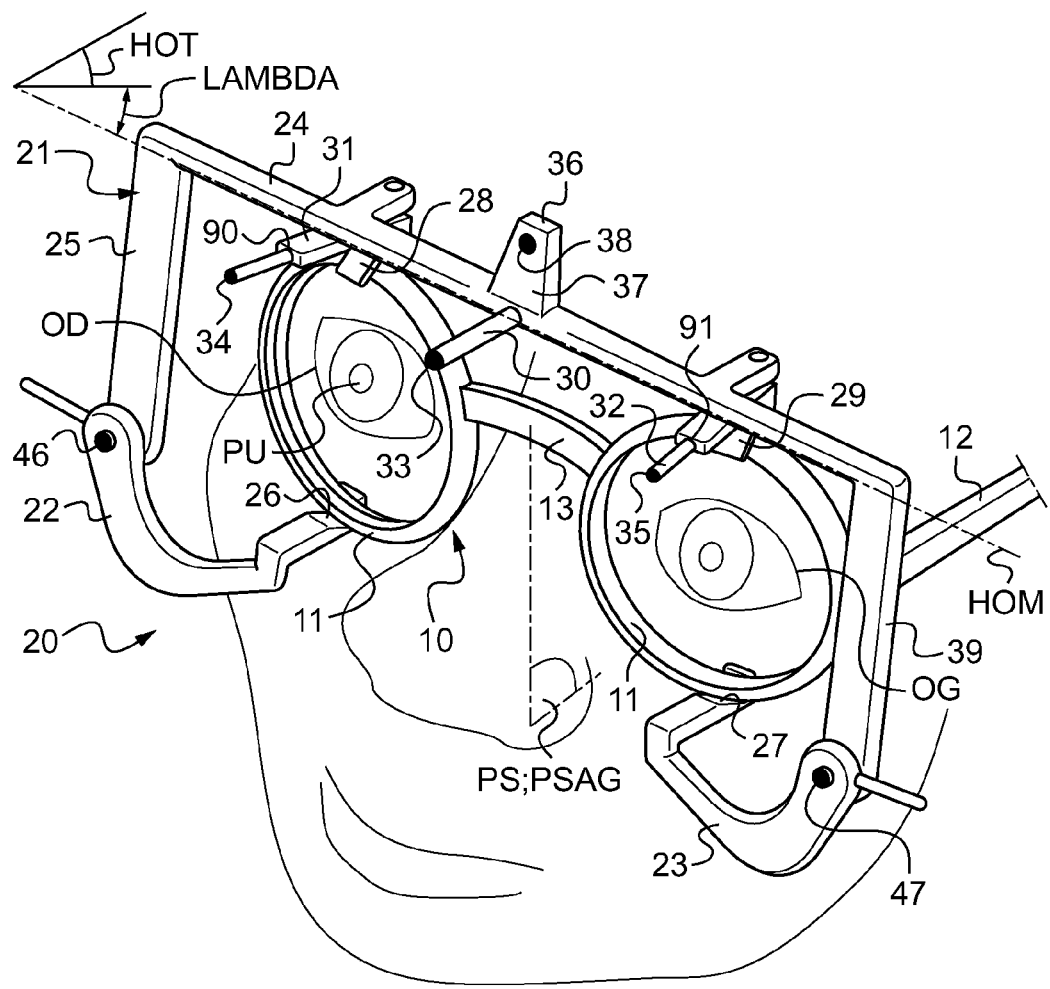
FIG. 3 is a perspective view of a first embodiment of a position-identification accessory fitted to the frame.
Figure 4:
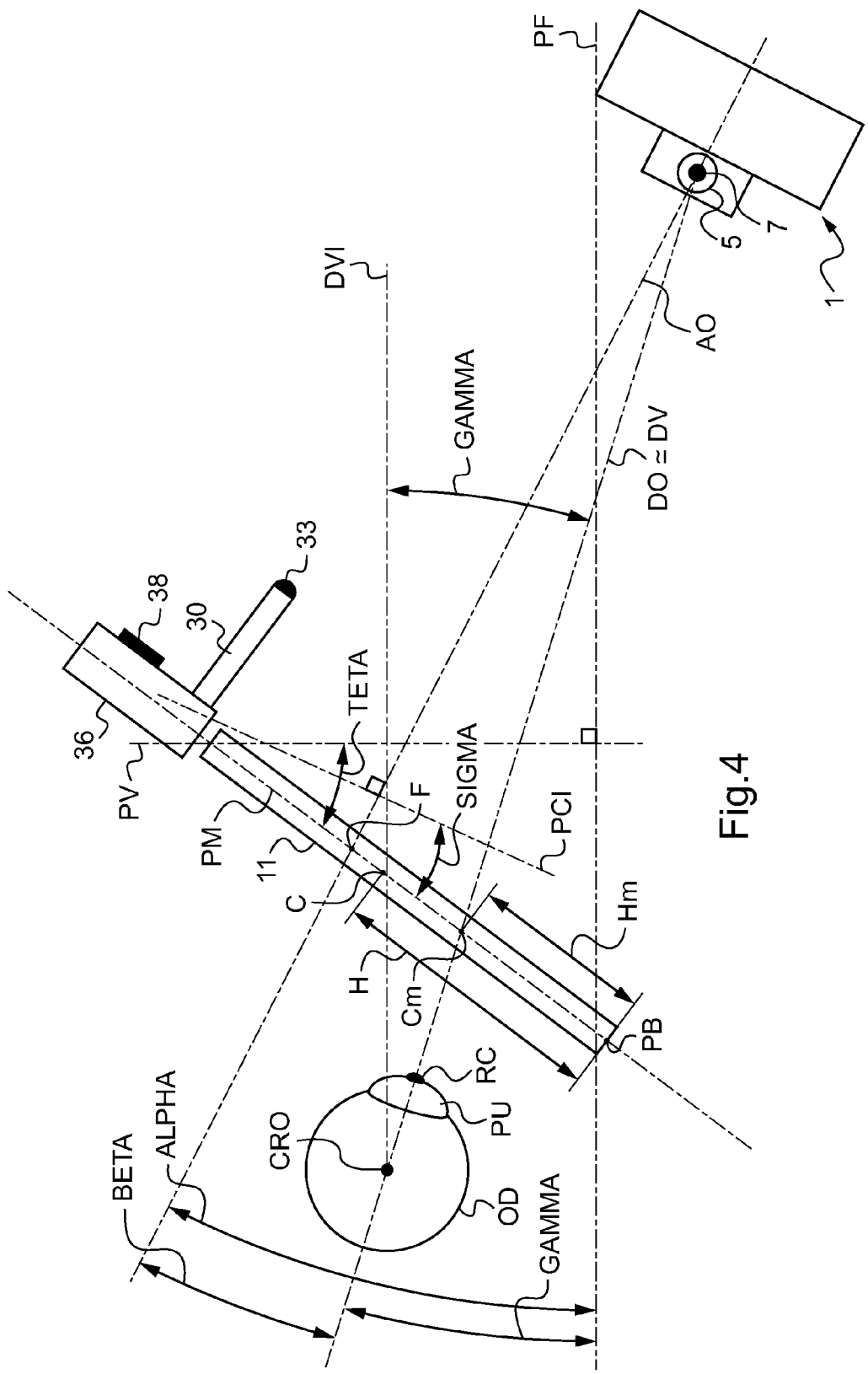
Figure 5:
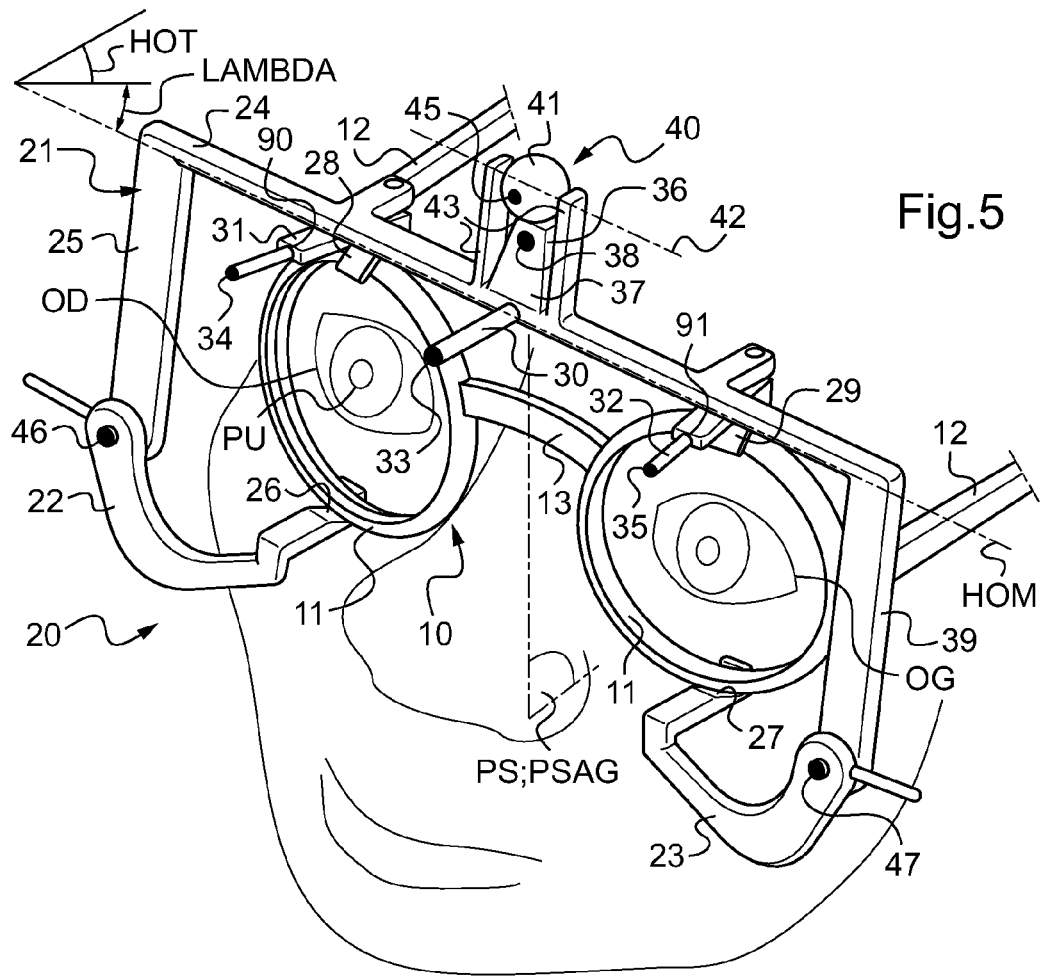
Figure 7:
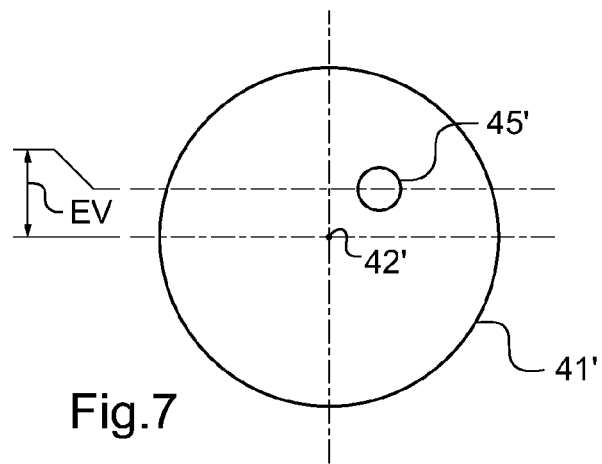
Figure 6:
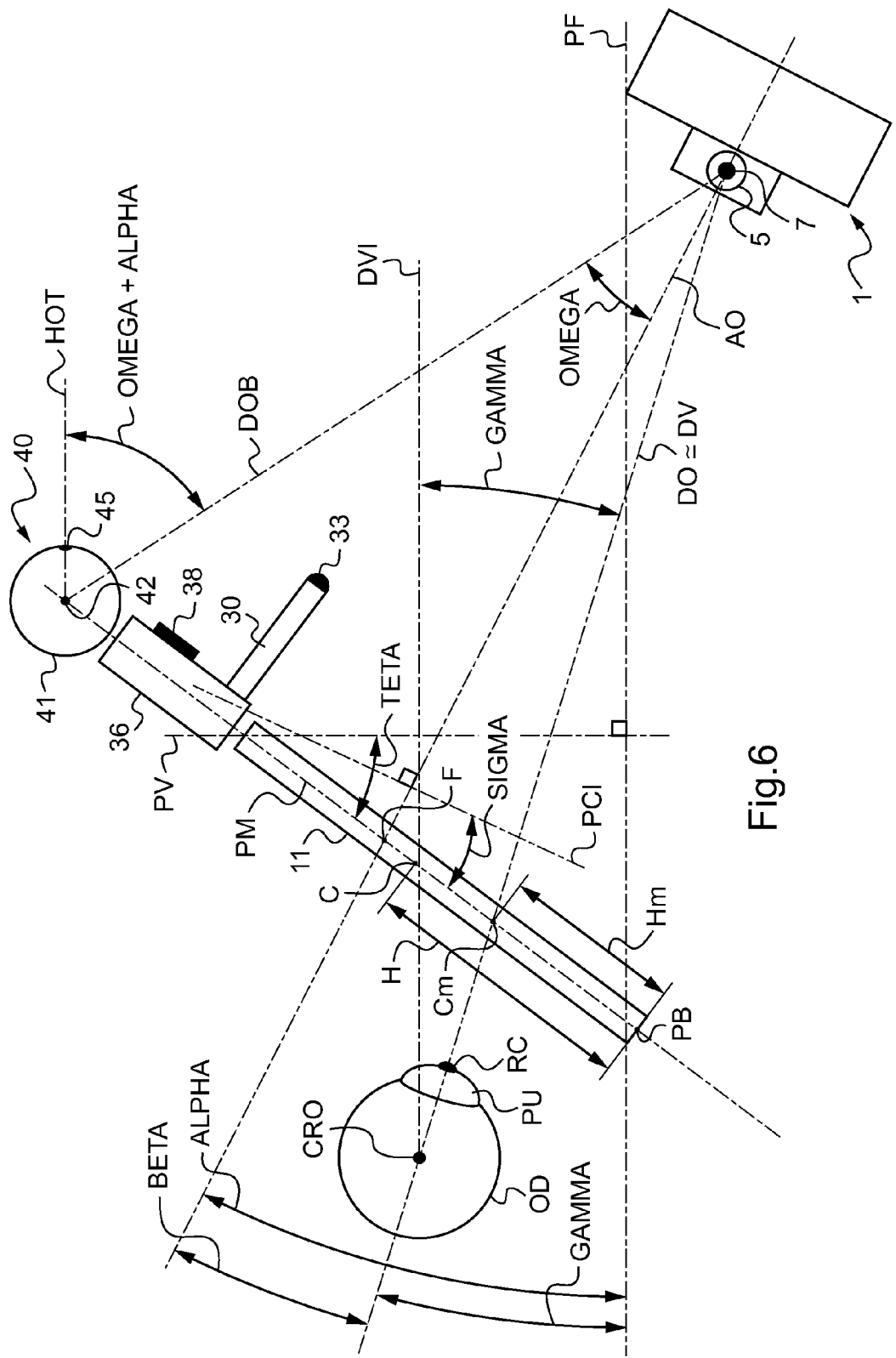
Figure 8:
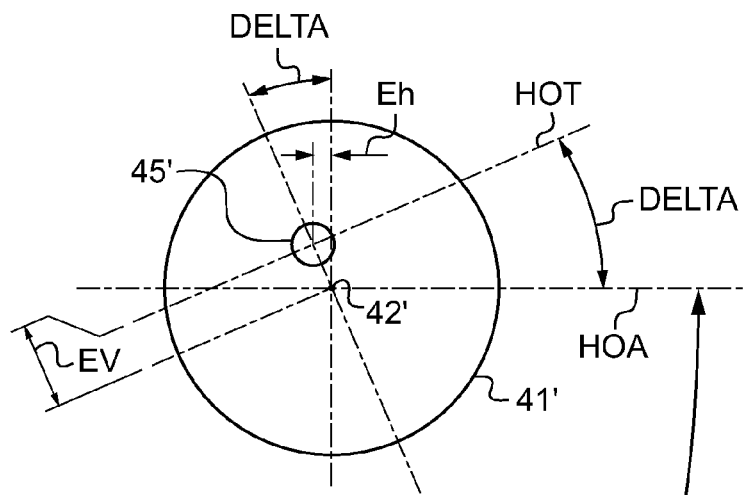
Figure 9:
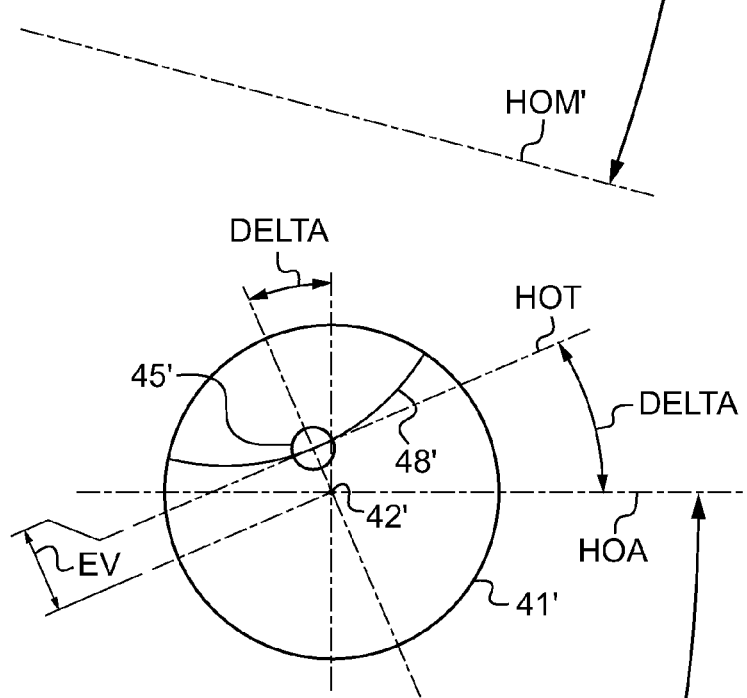
Figure 10:
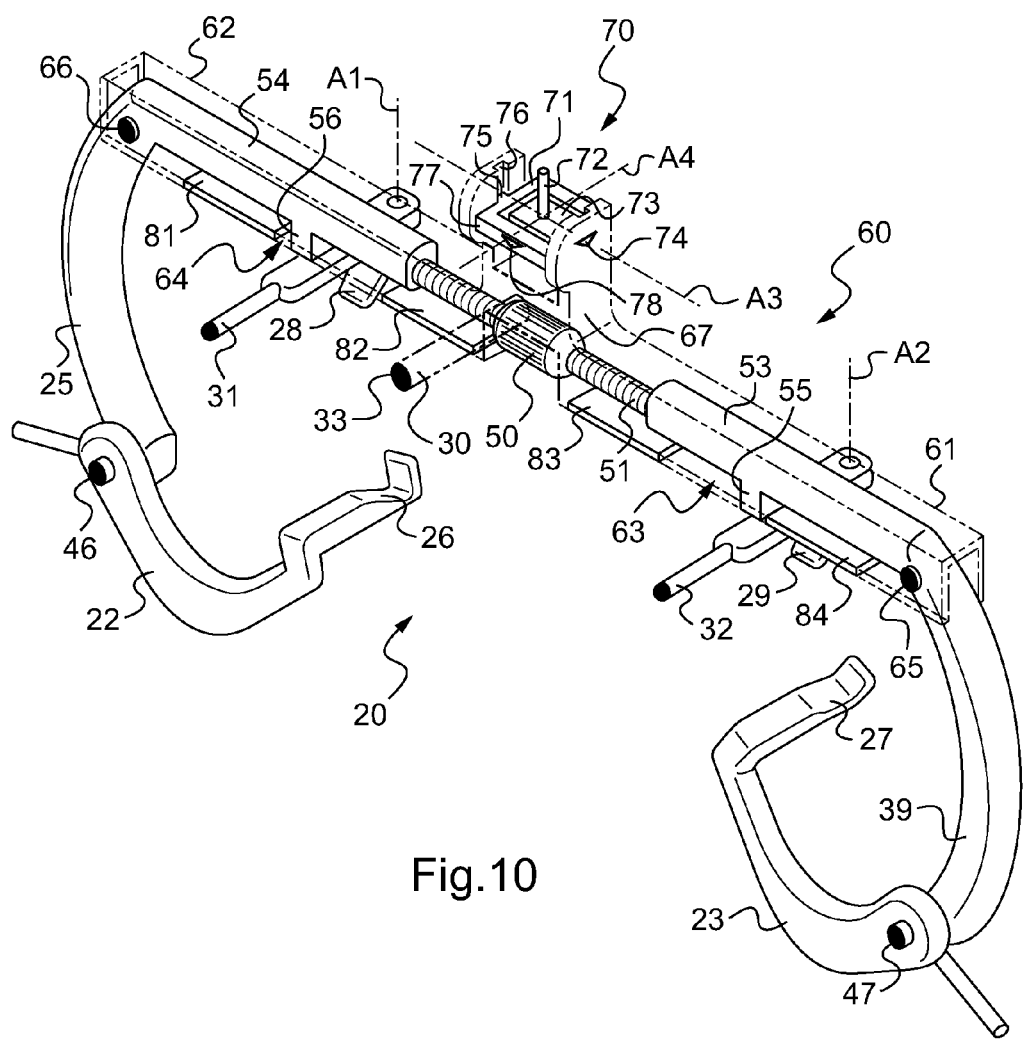

FIG. 4 is a diagrammatic elevation view in profile with its proportions deformed to make it easier to read, showing how a front-view image of the frame and of the eye is captured together with the geometrical elements used in calculating the geometrico-physiognomic parameters, in a first implementation of the measurement method of the invention, using the position-identification accessory of FIG. 3;

FIG. 5 is a view analogous to FIG. 3 showing a second embodiment of the position-identification accessory fitted to the frame;

FIG. 6 is a view analogous to FIG. 4, showing the capture of a front-view image of the frame and the eye together with the geometrical elements used in calculating the geometrico-physiognomic parameters in a second implementation of the measurement method of the invention, using the position-identification accessory of FIG. 5;

FIG. 7 is a view of the captured image of the horizon-reference elements;

FIG. 8 is a view analogous to FIG. 7 showing a variant of the horizon-reference element and of the method, for measuring an absolute roll angle of the wearer's head;

FIG. 9 is a view analogous to FIG. 8 showing another variant of the horizon-reference element and of the method, for measuring an absolute roll angle of the wearer's head; and FIG. 10 is a view analogous to FIG. 3 showing a variant of the second embodiment of the position-identification accessory fitted to the frame.

Figure 1:
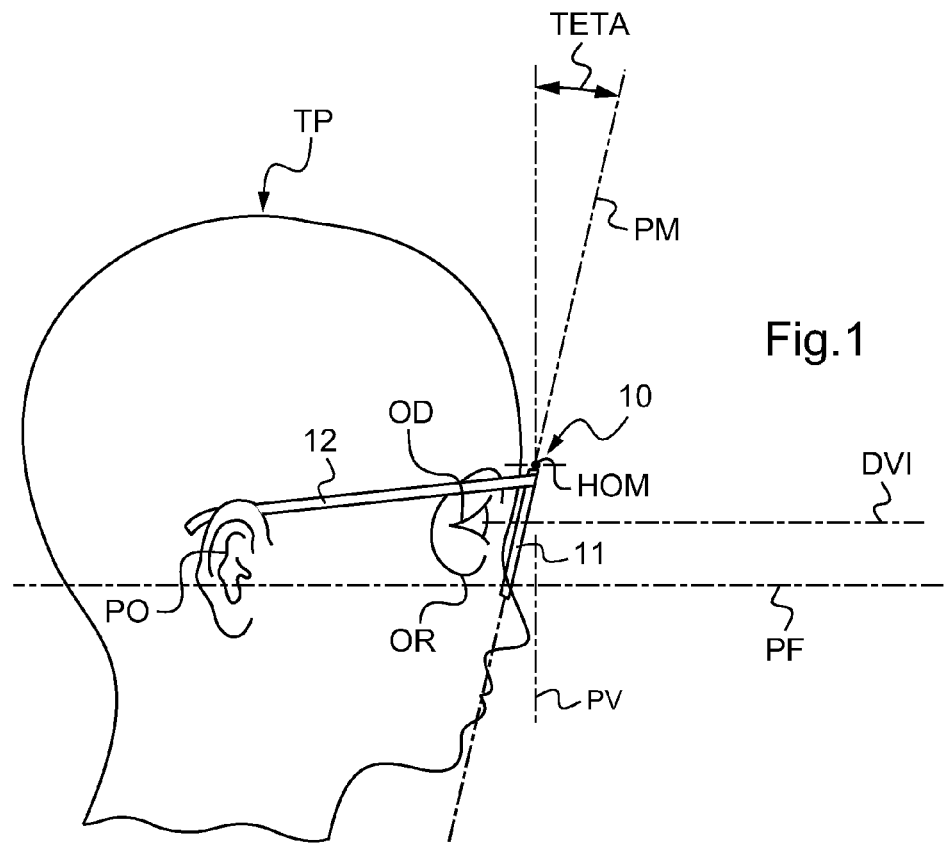
FIG. 1 is a profile view of the head of a wearer fitted with a pair of eyeglasses.

In the description below, and as shown in FIG. 1, it is assumed that the wearer is in a sitting or standing configuration in which the wearer's head TP is straight, i.e. in which Frankfurt's plane PF relating to the wearer's head is substantially horizontal. As shown in FIG. 1, Frankfurt's plane PF is defined as a plane containing the lower orbit points OR and the porion PO of the wearer, where the porion is the highest point of the acoustic meatus, corresponding to the tragion of the ear. It is also said that the wearer takes on an orthostatic position, a position requiring minimum effort. The gaze axis or line of sight DV of the wearer is initially the horizontal primary line of sight DVI corresponding to the wearer looking at the horizon straight ahead at infinity.

A sagittal or mid-plane PSAG is also defined for the wearer's head TP, parallel to the plane of FIG. 1, and shown diagrammatically in FIG. 3.

The wearer is wearing a frame 10 as previously selected by the wearer, and on which lenses are to be mounted to exert a vision-correcting optical function in accordance with a prescription. The frame 10 conventionally comprises two rims 11 interconnected by a nose bridge 13, and two temples 12. Each rim 11 lies in a mean plane PM that, in profile view, forms relative to a vertical plane PV (e.g. containing the nose bridge 13) a vertical angle of inclination TETA [theta] about a horizontal direction perpendicular to the sagittal plane PSAG. This angle TETA is commonly referred to as the pantoscopic angle.

In the examples below, the main objective is to determine the geometrico-physiognomic parameters of the wearer's head TP and of the frame 10 in order to personalize the design and/or adapt the pair of corrective lenses to the physiognomy of the wearer's head and to the geometry of the frame, in compliance with the desired optical corrective function.

More particularly, the following need to be determined accurately:

firstly, the height H of the pupil PU of each eye OD, OG relative to the lowest point PB of the corresponding rim 11 of the frame 10 so as to enable the corrective lens to be properly centered, i.e. so as to ensure the centering point or pupil point C of its optical frame of reference is positioned relative to the eyeglass frame so as to enable the lens to be shaped in a manner that is adapted to the wearer and to the selected frame; specifically, this height H is the distance between firstly the lowest point PB of the rim 11 of the frame and secondly the centering point or pupil point C as defined by the point of intersection of the primary gaze axis DVI (line of sight at infinity) and the mean plane PM of the rim 11 of the frame, alternatively, other known definitions for eye height could be used; and secondly, the pantoscopic angle of inclination TETA of the mean plane of the rim 11 of the frame, and thus of the corrective lenses, thereby making it possible to provide personalized optical design of one and/or other of the two refracting faces of the corrective lens.

Figure 2:
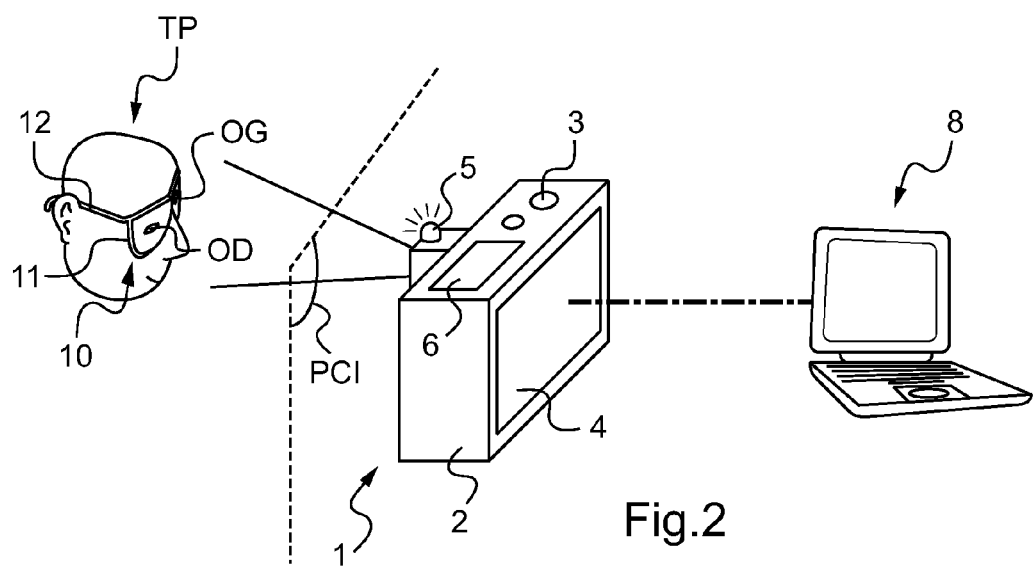
FIG. 2 is a diagrammatic perspective view of a device enabling geometrico-physiognomic parameters to be measured for positioning eyeglasses on the face of the wearer in accordance with the invention.

In FIGS. 2 and 3, there can be seen a device for determining individual geometrico-physiognomic parameters of a wearer fitted with a presentation pair of eyeglasses.

The device includes a digital image-capture appliance 1, e.g. similar to a commercially available digital pocket camera that comprises, as shown in FIG. 2, a casing 2, a trigger button 3, and a display screen 4. The image-capture appliance 1 in this example further includes a light source or target 5, such as a light-emitting diode (LED) suitable for attracting the gaze of the wearer and for generating an image of its own reflection on the cornea of each of the wearer's eyes. This light target 5 is adjacent to the lens of the image-capture appliance 1. In a variant, the image of the corneal reflection may be generated by a flash associated with the image-capture appliance.

In a variant, it would be advantageous for the image-capture appliance to be a video camera or a camera for taking a burst of images in rapid succession in order to provide a plurality of exposures from which it is possible to calculate a mean, or to apply filtering, or indeed to select the most pertinent exposure.

In any event, the image-capture appliance 1 is suitable for being handled by the optician to capture, in an image-capture face-view plane PCI, an image of the wearer's face wearing the frame.

The image-capture appliance 1 also possesses means for communicating with a computer 8 fitted with corresponding communications means. The communications means of the image-capture appliance 1 and of the computer 8 are of the wired or wireless type, and since they may be of any conventional design, they are not described. Advantageously, these communications means incorporate a common network architecture or a point-to-point link, enabling the image-capture appliance to communicate with a plurality of computers.

The measurement device further includes means for measuring a tilt or pitch angle ALPHA formed between the optical axis AO of the lens of the image-capture appliance 1 and its projection onto the horizontal plane PF. In this first example, the image-capture appliance 1 is fitted with an embedded electronic tilt meter 6 adapted to deliver a signal representative of the value taken by the tilt angle ALPHA at the time the image is captured. By way of example, it is possible to use a compact tilt meter of the capacitive sensor type (including an accelerometer or a gravitometer), a magnetic sensor suitable for measuring the terrestrial magnetic field, or an artificial field. It is also possible to use a position capture system of the kind sold by the supplier Polhemus, or indeed a gyroscope, etc.

The measurement device advantageously, but not necessarily, includes a position-identification accessory 20 that is fitted onto the frame 10 and that makes it possible to improve the reliability and the accuracy with which measurements are taken, as explained below.

An example of such a position-identification accessory 20 is shown in FIG. 3 and is described below in its in-service configuration, i.e. when fitted on a frame that is itself considered in its configuration when in position on the face of the wearer who is in the above-described orthostatic posture. This accessory comprises a hinged linkage made up of an upside-down U-shaped bracket 21 extending in a substantially vertical plane, and two locking levers 22 and 23. The bracket 21 possesses a horizontal cross-member 24 and two vertical uprights 25 and 39 having their ends pointing downwards. The two locking levers 22 and 23 are mounted on the ends of the uprights 25 and 39 to pivot in the plane of the bracket, i.e. about axes that are horizontal. A spring (not shown) is mounted between each locking lever 22, 23 and the bracket in order to urge the levers continuously towards the cross-member 24. The locking levers 22, 23 thus bear against the rims of the frame 10 (or directly against its lenses if the eyeglasses are of the rimless type, having drilled lenses) so as to hold the position-identification accessory 20 on the frame. V-shaped shoes 26, 27, 28, and 29 provided with a non-slip coating are fitted to the cross-member 24 and to the levers 22 and 23 to receive the rims of the frame (or the edges of the lenses) and to co-operate therewith out sliding, so as to fasten the position-identification accessory 20 in stable manner on the eyeglasses. The assembly is arranged in such a manner that the bracket 21 presents a plane of symmetry PS that, in operation, coincides at least approximately with the sagittal plane PSAG of the wearer.

The position-identification accessory 20 is provided with a plurality of position-identification elements, including the following:

a central head-pointer 30 secured in the plane of symmetry PS of the bracket 21, projecting horizontally from the cross-member 24 and pointing forwards (i.e. away from the wearer's face), and possessing a rounded free end 33 that is colored;

two lateral head-pointers 31 and 32 disposed symmetrically to each other about the plane of symmetry PS, projecting horizontally from the cross-member 24, pointing forwards, while diverging laterally, and each possessing a rounded free end 34, 35 having a contrasting mark formed thereon, e.g. a mark that is black or colored; and a pole 36 centered on the plane of symmetry PS, projecting vertically upwards from the cross-member 24 in such a manner as to be above the central head pointer 30, and possessing a front face 37 with a top portion that carries a contrasting mark 38, e.g. in the form of a black or colored disk.

The respective positions in three-dimensional space of the end marks on the head pointers 30, 31, and 32 and on the pole 36 constitute known geometrical characteristics that are stored as constant parameters in the calculation software installed on the computer 8.

The two lateral head pointers 31, 32 are secured to the shoes 28, 29 that are themselves mounted on the cross-member 24 to pivot freely (through a limited angular range and with resilient return to a given angular position) about axes that are substantially vertical. Thus, when the position-identification accessory 20 is mounted on the frame 10, the shoes 28, 29, by virtue of their V-shapes, automatically take up orientations that match the horizontal orientation (i.e. about the vertical) of the mean plane of the corresponding rim 11 of the frame (or of the corresponding presentation lens with rimless, drilled frame eyeglasses).

The above-described measurement device enables the following method to be implemented for measuring geometrico-physiognomic parameters for positioning the frame 10 on the wearer's face.

Before taking any measurements, two calibration steps need to be performed. These calibration steps are performed before taking the first measurements, and there is no need to perform them again before taking each measurement.

Initially, the image-capture appliance 1 is calibrated in order to define a characteristic function of the appliance, suitable for determining, for a given object point in three dimensions in the frame of reference of the image-capture appliance 1, the coordinates of the image point associated with said object point on a captured image.

This calibration is performed using images taken by the image-capture appliance 1 of various known plane targets. Such methods are themselves known and described in numerous documents, and in particular in the article entitled "Modeling and calibration of automated zoom lenses" by R. G. Willson, published in Proceedings of the SPIE 2350: Videometrics III, pp. 170-186, Boston, Mass., USA, in October 1994.

Thereafter, the position-identification accessory 20 is calibrated by determining a model for the position-identification accessory 20. For this purpose, the relative positions of the contrasting marks 33, 38, 46, and 47 are determined. In order to determine these relative positions, it is possible to use a minimum of four marks presented on the position-identification accessory 20, and at least three different image captures. The model of the position-identification accessory 20 comprises firstly global parameters, common to all of the images, such as parameters relating to the geometry of the position-identification accessory 20, and secondly intermediate variables that are specific to the image-capture configuration, such as the position and the orientation of the position-identification accessory 20 relative to the image-capture appliance 1. These parameters and variables of the model are then calculated by iteration so as to cause the coordinates calculated from the model for the contrasting marks as projected onto the theoretical image to approach the coordinates identified in the various captured images of the same marks.

Once the image-capture appliance 1 and the position-identification accessory 20 have been calibrated, all of the information (equations, constants, parameters) needed for subsequently processing recorded images is available. This information serves to associate the two-dimensional positions of the contrasting marks on an arbitrary image with their real positions in three dimensions.

By way of example, the following process may be followed.

A frame of reference for the position-identification accessory is defined on the basis of four marks, e.g. the marks 46, 47, 33, and 38, and an origin point O. One axis (Ox) passes through the two marks 46 and 47, one axis (Oy) passes through the mark 38 and the origin point of defined as being the orthogonal projection of the mark 38 on the axis (Ox), and one axis (Oz) is such that the (O, Ox, Oy, Oz) frame of reference is a right-handed rectangular frame of reference. The coordinates of the four marks are then determined in the frame of reference of the position-identification accessory as defined in this way: the mark 47 has coordinates (d,0,0), the mark 46 has coordinates (−g,0,0), the mark 38 has the coordinates (0,h,0), and the mark 33 has the coordinates (a,b,c).

To go from the frame of reference of the position-identification accessory to the frame of reference of the image-capture appliance 1, a transformation is used comprising one movement in translation and three movements in rotation about the three axes of the frame of reference of the position-identification accessory. Going from the frame of reference of the position-identification accessory to the frame of reference to the image-capture appliance 1 thus involves, in the arbitrary case:

a rotation through an angle N1 about an axis (Oz) corresponding to the following transformation matrix R1:

$$R1 = \begin{pmatrix} \cos(N1) & \sin(N1) & 0 \\ -\sin(N1) & \cos(N1) & 0 \\ 0 & 0 & 1 \end{pmatrix}$$

a rotation through an angle N2 about the axis (Ox) corresponding to the transformation matrix R2:

$$R2 = \begin{pmatrix} 1 & 0 & 0 \\ 0 & \cos(N2) & \sin(N2) \\ 0 & -\sin(N2) & \cos(N2) \end{pmatrix}$$

a rotation through an angle N3 about the axis (Oy) corresponding to the transformation matrix R3:

$$R3 = \begin{pmatrix} -\cos(N3) & 0 & \sin(N3) \\ 0 & 1 & 0 \\ -\sin(N3) & 0 & -\cos(N3) \end{pmatrix}$$

and a movement in translation T=[Tx Ty Tz].

The coordinate vector Mraci of an object point M of the position-identification accessory 20 in the frame of reference of the image-capture appliance 1 can then be calculated from the known coordinate vector Mrar of said point in the frame of reference in the position-identification accessory 20 by the following expression:

$$Mraci = T + Mrar \cdot R1 \cdot R2 \cdot R3$$

Finally, the coordinate vector Mimage of the image point associated with said object point on a captured image can be calculated from the coordinate vector Mraci of said object point in the frame of reference of the capture appliance 1 because of the calibration of the capture appliance. The characteristic function of the capture appliance 1 may for example correspond to a polynomial function. The coordinates (u,v) are then obtained of the image point associated with a point having coordinates (x,y,z) in three dimensions by a transformation that may be written in the following form:

$$u = k1 \cdot X^5 + k2 \cdot X^4 \cdot Y + \ldots + kn$$

and $$v = k1' \cdot X^5 + k2' \cdot X^4 \cdot Y + \ldots + kn'$$

where X=x/z and Y=y/z. With an image-capture appliance of the pinhole type, the transformation will be written:

$$u = f \cdot x/z + u0 \text{ and } v = f \cdot y/z + v0$$

The parameters of the characteristic function of the image-capture appliance used, e.g. (k1, k2, ..., kn, k1', k2', ..., kn'), or (f, u0, v0) are determined during calibration of the image-capture appliance 1.

The global parameters d, g, h, a, b, and c of the position-identification accessory and the intermediate variables N1, N2, N3, Tx, Ty, and Tz defining its position relative to the image-capture appliance during the various image captures are determined iteratively so as to cause the theoretical positions of the marks of the position-identification accessory on the image to coincide with their real positions in the captured images.

The optician places the presentation pair of eyeglasses 10 fitted with the position-identification accessory 20 on the wearer's face. The wearer is sitting or standing in the orthostatic posture with the head upright, i.e. with Frankfurt's plane PF substantially horizontal, as mentioned above. The optician takes care to ensure that this posture is indeed taken up.

A top boxing line HOM is then defined interconnecting the tops of the V-shaped shoes 28, 29. This line is substantially tangential to the tops of the two rims 11 of the frame and is thus substantially perpendicular to the plane of symmetry PS of the frame 10.

In the following description of the measurement method that is implemented by the software installed on the computer 8, the calculation rules applied by the software and given by way of example make use of geometrical magnitudes that are defined relative to the figures. In particular, FIGS. 4 and 6 are diagrammatic elevation views in projection onto the plane PS or PSAG along the direction of the top boxing line HOM.

The optician or operator takes hold of the image-capture appliance 1 and places it facing the face of the wearer and at substantially the same height, as well as possible. The face-view position is then approximate, but not perfect. The optician turns on the LED 5 by pressing the button 3 down to a first level and asks the wearer to look at the LED. It can then be assumed, without significant error, that the wearer observes the entry pupil of the image-capture appliance 1, i.e. that the gaze axis DV coincides with the line of observation DO. The optician then asks the wearer to continue keeping the head in the orthostatic posture as described above, and it can be assumed that this can be done without difficulty, insofar as the image-capture appliance 1 is in a facing position and approximately (although not exactly) at the same height as the face.

The optician adjusts the image-capture appliance 1 using the screen 4 in order to center the wearer's face appropriately, and then triggers image capture by means of the button 3 while simultaneously also obtaining the tilt angle ALPHA from the incorporated tilt meter 6.

If the absolute value of the angle ALPHA exceeds at threshold value, e.g. 20 degrees, then the measurement is rejected and a visible and/or audible warning message is issued by the image-capture appliance 1 or by the computer 8 to invite the optician to capture a new image while ensuring that the image-capture appliance 1 is better positioned facing the wearer and at a height that is closer to the height of the wearer.

The image-capture appliance 1 can transmit the image captured in this way to the computer 8, which records it in its random access memory (RAM) or its mass memory, so that it can be processed by the processing and calculation software installed on the computer 8.

The image-capture appliance 1 also transmits the tilt angle ALPHA to the computer 8, which records it in its RAM or mass memory accessible to the processing and calculation software installed on the computer 8. The tilt angle ALPHA is the angle formed between the optical axis AO of the image-capture appliance 1 and its projection onto the horizontal plane PF while the image was being captured, and it is this angle that is provided by the embedded tilt meter 6.

The software is designed to perform a comparison calculation between the known geometrical characteristics and the corresponding geometrical characteristics in the captured plane image as measured by processing the image and counting its pixels, with it being possible from this comparison to deduce:

firstly, given the dimensional scaling of the captured image and pixel counts in the image, the positions of the pupils of the wearer's eyes relative to the frame (or vice versa), the dimensions of the frame, etc., as seen in projection in the image-capture plane (which is perpendicular to the optical axis of the image-capture appliance and which may be tilted relative to the general plane of the frame); and secondly, the values of the horizontal and vertical components of the orientation of the position-identification accessory 20 relative to the optical axis of the image-capture appliance 1, with the calculation of these angles not necessarily requiring any scaling.

Dimensionally scaling the image consists in calculating a scale factor that, for the image-capture configuration, represents the ratio of proportionality between a real dimension of a geometrical element in the captured image and the number of image pixels occupied by this element in the direction of the dimension under consideration.

By way of example, scaling is performed by the processing and calculation software by comparing the distance between the images on the captured image between two remarkable points of the position-identification accessory 20, such as the ends of the cross-member 24 or the marks 46 and 47, with the known real distance between those remarkable points (which known real distance is incorporated as a parameter of the processing and calculation software).

This scaling may also be performed by using a telemetry subassembly to measure the distance between the image-capture appliance and the wearer's head. For example, it is possible to use position capture systems that are fitted firstly to the wearer or to the frame, and secondly to the image-capture appliance 1 so as to provide the relative distance between image-capture appliance 1 and the wearer's head. Alternatively, it is possible to use any other telemetry system, e.g. using ultrasound, a laser, triangulation, a split-image rangefinder, or the like.

In order to calculate the pantoscopic angle TETA of the frame, the software counts pixels and takes the scale factor into account to calculate the difference in height between the image of the mark 38 on the pole 36, and the image of the end 33 of the central head pointer 30. It will be understood that the forward offset of the end 33 of the central pointer 30 has the effect of causing the altitude of this end 33 to vary significantly with variation of the pantoscopic angle TETA. As a result, this height offset is representative of a relative vertical angle of inclination SIGMA formed between the mean plane PM of the frame and the image-capture plane PCI that is perpendicular to the optical axis AO of the lens of the image-capture appliance 1. The software then combines this angle SIGMA with the tilt angle ALPHA as delivered by the tilt meter 6 of the image-capture appliance 1 to deduce therefrom the looked-for pantoscopic angle TETA. The software makes use of the formula:

$$TETA = ALPHA + SIGMA \text{ or } TETA = ALPHA - SIGMA$$

depending on the angle sign convention used.

Thereafter, the software calculates the height H of the eye. For this purpose it identifies, in the captured image, the image of a predetermined remarkable point that is associated directly or indirectly with the face of the wearer or with the frame 10. Typically, this remarkable point may be part of the eye in question, of the frame, or of the position-identification accessory. Specifically, the software identifies in the image the center of the pupil of the eye under consideration, which center corresponds to the corneal reflection RC of the LED 5 of the image-capture appliance 1.

An observation line DO connecting the pupil 7 of the image-capture appliance 1 to the corneal reflection RC is thus defined. The software calculates a relative observation angle BETA formed between the observation line DO and the optical axis AO of the image-capture appliance 1. This relative observation angle BETA is deduced directly by the software, taking account of the scaling, and of the measurement of the captured image of the off-center position of the image of the corneal reflection RC relative to an image center associated with the optical axis AO of the image-capture appliance 1 and corresponding to the image F' of the point of intersection F between the optical axis AO and the plane PM.

The software then calculates an absolute observation vertical angle GAMMA formed between the observation line DO and its projection on a horizontal plane PF. For this purpose, the software combines the relative observation angle BETA as calculated above with the tilt angle ALPHA as provided by the embedded tilt meter 6 while capturing the image. The software applies the following formula:

$$GAMMA=BETA-ALPHA \text{ or } GAMMA=BETA+ALPHA$$

depending on the angle sign convention used.

The software also calculates the distance Hm between the bottom point PB of the rim 11 of the frame and the point of intersection Cm of the observation line DO and the mean plane PM of the rim 11 of the frame.

For this purpose, the software may for example measure on the captured image a distance Hm' between the bottom point of the image of the rim 11 of the frame and the center of the image of the pupil PU (specifically the center of the corneal reflection RC). The software then deduces the height Hm in the plane PM by means of the formula:

$$Hm=Hm'/\cos(GAMMA-TETA)$$

Finally, the software calculates the height H of the eye by means of the following formula:

$$H=(Hm+d(CRO,C)\cdot\sin(GAMMA))/\cos(TETA-GAMMA)$$

where d(CRO,C) is the distance between the point C and the center of rotation CRO of the eye under consideration, specifically the right eye OD. By way of example, this eye distance is determined by measuring the distance d(PU,C) between the point C and the pupil and then adding thereto a mean eye radius or an eye radius as deduced approximately from the prescription for the wearer. The distance d(PU,C), generally referred to as the lens-eye distance, can easily be obtained by direct measurement on the wearer using a simple rule, or by performing an automatic or manual measurement on an exposure taken in profile, or an automatic or manual measurement in front view using a telemeter system such as a split-image rangefinder or the like. It is also possible to take an indirect measurement from a combination of two front-view exposures associated with a parallax calculation, which method makes it possible to obtain directly the looked-for distance d(CRO,C).

Alternatively, it is possible to use the following formula:

$$H=(Hm+d(CRO,Cm)\cdot\sin(GAMMA))/\cos(TETA)$$

In a variant, it is also possible to deduce from the distance d(CRO,C) the position of the center of rotation CRO of the eye on the observation line DO, and then to deduce the point of intersection of the line of sight to infinity DVI with the mean plane PM of the rim 11 of the frame, which corresponds to the looked-for point C.

In a variant, provision could also be made, during image capture, for the wearer not to look at the image-capture appliance, but to look straight ahead, on the line of sight to infinity DVI. This encourages the wearer to maintain the above-defined orthostatic posture. Under such circumstances, the procedure is as set out above, but it ends by applying the following formula to calculate the height H of the eye:

$$H=(Hm+d(PU,C)\cdot\sin(GAMMA))/\cos(TETA-GAMMA)$$

where d(PU,C) is the distance between the pupil PU of the eye and the point C, which distance is measured in one of the ways mentioned above.

In a variant, provision could also be made during image capture for the image-capture appliance 1 to be pointed in such a manner that the remarkable point is centered on a centering mark in the viewfinder system of the image-capture appliance 1 so that the optical axis AO of the image-capture appliance 1 coincides with the observation DO. The off-center shift is then zero, as is the value of the angle BETA.

More advantageously, a self-diagnosis method is provided to verify the geometrical integrity of the position-identification accessory and thus the validity of the calculations performed. Since the position-identification accessory 20 possesses at least four marks 33, 38, 46, and 47, an arbitrary image of the position-identification accessory 20 gives eight coordinates for those four marks as represented in two dimensions. These eight coordinates make it possible to define a system of eight equations based on the above-described calibration step. Determining the position of the position-identification accessory 20 relative to the image-capture appliance corresponds to determining only six unknowns (three movements in translation and three rotations). The system of eight equations with six unknowns is thus overdetermined, and solving it gives rise to a residue. Calculating this residue serves to provide self-diagnosis relating to the validity of the results obtained by solving the system. If the model determined while calibrating the position-identification accessory is a correct representation of the geometry of said position-identification accessory at the time of measurement, then the value of the residual is very small. A very small residue thus demonstrates that the position-identification accessory has not been deformed since the calibration step. In contrast, if the value of the residual is large, then the position-identification accessory no longer corresponds to the model that was determined during calibration, which means that the position-identification accessory has been deformed. Under such circumstances, the system issues a warning indicating that the measurement is likely to be erroneous and suggesting that the position-identification accessory be recalibrated in its current state before taking a new measurement.

In a variant, this self-diagnosis method consists in adding two unknowns to the system. By way of example, it can be decided to measure a z component for the two marks 46 and 47 at the ends of the bracket 21, which corresponds to deformation in bending of the position-identification accessory 20 about a vertical axis intersecting the head pointer 30. Two parameters zd and zg are then introduced such that the coordinates of the marks 47 and 46 are written respectively (d,0,zg) and (−g,0,zg) in the frame of reference of the position-identification accessory 20. The system of eight equations thus possesses eight unknowns and it is no longer overdetermined. The coordinates of the z components of the marks 46 and 47 are then determined by solving the system, and they are compared with the coordinates of the model of the position-identification accessory as determined by calibration. If the calculated coordinates are different from those of the model, then the position-identification accessory has been deformed. In these circumstances, the deformation is quantified and the system can issue a warning if the difference in the coordinates of the z components of the marks 46 and 47 exceeds a certain threshold.

The principle of this self-diagnosis method can be applied to other portions or sub-portions of the position-identification accessory having suitable marks and modeled by a set of parameters. This method relies on a prior assessment of a probable mode of deformation. For example, it may be considered that the position-identification accessory does not deform in elongation in the transverse direction of the bracket, but it does deform easily in bending or twisting.

This provides a distance and scaling measurement that is correct, thus making it possible to ensure that the measurements of the geometry of the frame and of the morphology of the wearer are accurate and precise.

Advantageously, the model of the position-identification accessory can be refined by a training method. The model of the position-identification accessory contains a plurality of global parameters including a set of parameters that are constant and a set of parameters that are adjustable, corresponding respectively to the rigid and non-deformable portions and to the flexible and deformable portions of the position-identification accessory. The principle of improving the model by training consists in using a series of images in which the position-identification accessory retains the same geometry. By definition the constant parameters are the same in all of the images, and the adjustable parameters determined from the images should be identical for an entire series of images under consideration. If sufficient images are captured, then the system is overdetermined, and the residue can be used to evaluate confidence in the measurements, or possibly to extend the model by transforming constant parameters into adjustable parameters in the event that solving the system leads to a residue that is too great.

FIGS. 5 and 6 show a second embodiment of the device and a second implementation of the measurement method of the invention. The measurement device is similar to that described above with reference to FIGS. 3 and 4, and elements that reappear are given the same numerical references. Two main modifications have been applied: firstly the image-capture appliance 1 does not have an embedded tilt meter, and secondly the position-identification accessory is provided with an artificial horizon device 40.

The artificial horizon device 40 comprises a horizon-reference bead 41 mounted on the bracket 21 to turn freely about an axis 42 that is parallel to the cross-member 24, and is thus horizontal. More precisely, the bead 41 is mounted between the ends of two vertical branches of a fork 43 that project up from the cross-member 24 on either side of the pole 36, so that the bead 41 is above the pole.

The bead 41 is weighted or hollowed out asymmetrically such that its center of gravity is offset from its axis of rotation 42. Under the effect of gravity the bead 41 is thus caused to conserve a naturally constant angular position relative to the horizontal plane PF, regardless of the pantoscopic angle of inclination TETA of the frame.

The bead 41 presents a spherical surface carrying a spot 45 that, when the sphere 41 is in a stable gravity-return position, is situated at the pole of the front hemisphere that is formed by the front portion of the surface of the bead 41 and that is defined by the vertical plane that contains the axis of rotation 42.

In operation, the optician captures an image of the wearer's face wearing the frame and the position-identification accessory, as described above. On the captured image of the wearer's face, as shown in FIG. 7, there can be seen an image 41' of the horizon-reference bead 41.

On the captured image, the software identifies the image 41' of the horizon-reference bead 41, and then measures the vertical difference EV between the center 42' of the outline of the image 41' of the bead 41 (corresponding to the image of the center 42 of the bead 41) and the center of the image 45' of the spot 45, with scaling being taken into account. This difference is representative of the tilt angle ALPHA of the image-capture appliance 1. The following relationship applies:

$$\text{ALPHA} = \arcsin(EV/R) - \text{OMEGA}$$

where R is the radius of the bead 41 and OMEGA is the bead observation angle formed between firstly a bead observation line DOB connecting the center of the pupil 7 of the image-capture appliance 1 to the center 42 of the bead 41, and secondly the optical axis AO of the image-capture appliance 1. This bead observation angle OMEGA is deduced directly by the software, while taking account of the scaling, from a measurement in the captured image of the off-center shift of the image 42' of the center of the bead 41 relative to an image center associated with the optical axis AO of the image-capture appliance 1 and corresponding to the image F' of the point of intersection F between the optical axis AO and the plane PM.

The software is also designed to calculate from the captured image an absolute roll angle LAMBDA of the position-identification accessory 20 and thus of the wearer's head in a natural posture. This angle LAMBDA is shown in FIG. 5 and corresponds to the angle formed by the top boxing line HOM interconnecting the tops of the V-shaped shoes 28 and 29 with its orthogonal projection onto the terrestrial horizontal plane HOT. This absolute roll angle LAMBDA of the wearer in a natural posture is useful in performing optical calculation and/or adapting the lenses to the wearer and to the selected frame.

The absolute roll angle LAMBDA of the wearer is determined as follows by the image processing and calculation software installed on the computer 8.

An internal horizon line HOA is defined that is associated with the image-capture appliance 1 and that constitutes an internal parameter of the software internal to the appliance 1 and associated with the captured image, such that the line HOA is parallel to the horizontal terrestrial plane HOT when the absolute roll angle of the image-capture appliance 1 is zero.

The software determines the relative roll angle KAPPA of the position-identification accessory 20 in the frame of reference of the image-capture appliance 1. As shown in FIGS. 8 and 9, the angle KAPPA is the angle formed in the captured image between the internal horizon line HOA of the image-capture appliance 1 and the image of an arbitrary horizon line associated (directly or indirectly) with the wearer, such as the image HOM' of the line HOM associated with the accessory 20 and with the frame 10 or indeed the line interconnecting the images of the marks 46 and 47. This horizon line associated with the wearer is determined by simple processing of the image on the basis of characteristic points that can be identified by the software.

Thereafter, the software determines an absolute roll angle DELTA of the image-capture appliance 1 about its optical axis AO or about the projection of its optical axis on a horizontal plane. This angle is the angle formed between the internal horizon line HOA and its projection on the terrestrial horizontal plane HOT.

This angle DELTA may be determined in various ways.

By way of example, the angle DELTA may be captured directly by a tilt meter fitted to the image-capture appliance 1, as described above, for determining the tilt angle of the image-capture appliance 1.

The software then calculates the absolute roll angle LAMBDA of the wearer of the position-identification accessory 20 and thus of the wearer's head in a natural posture by adding the absolute roll angle DELTA of the appliance to the relative roll angle KAPPA, or by taking the difference between them, depending on the sign convention.

In an improvement shown in FIG. 8, provision can be made for the software to determine the absolute roll angle DELTA of the image-capture appliance 1 without having a specific sensor incorporated in the appliance 1, but on the basis of the captured image. To do this, it is possible for example to provide the following arrangement. The horizon-reference bead 41 is mounted to turn freely about a second horizontal axis of rotation that is perpendicular to the axis 42. This second axis of rotation is parallel to the observation line at infinity DOI. The horizon-reference bead is also asymmetrically weighted or hollowed out, such that its center of gravity is offset from this second axis of rotation. The bead 41 is thus caused, by the gravity return effect, to conserve a naturally constant angular position relative to the horizontal plane PF, regardless of the absolute roll angle of the frame.

In a variant, it is possible to use a circular bubble level of the type made available by the supplier Level Development under the reference AV12 230', associated with a 45 degree reflector. The bubble is then analogous to the spot 45.

In order to calculate the absolute roll angle DELTA of the appliance, the software measures in the captured image, as shown in FIG. 8, the horizontal offset Eh (along the internal horizon line HOA) of the image 45' of the spot 45 relative to the center 41' of the image of the bead 41. Alternatively, the software may also process the image to calculate the angle between the internal horizon line HOA and the line connecting the geometrical center of the image of the bead 41 to the center of the image of the spot 45'. The complement of this angle corresponds to the looked-for absolute roll angle DELTA of the appliance.

In a variant shown in FIG. 9, it is also possible advantageously to make provision for the surface of the reference bead 41 not only to be provided with the spot 45, but also to be provided with a linear latitude mark 48 that is parallel to the terrestrial horizontal plane HOT when the absolute roll angle LAMBDA of the wearer is zero, i.e. specifically when the line HOM is substantially horizontal. The orientation of the image 48' of the latitude mark 48 on the captured image is then representative of the absolute roll angle DELTA of the image-capture appliance 1.

In this configuration, FIG. 9 shows the image captured by the image-capture appliance 1. The reference HOT designates the tangent to the image 48' of the latitude mark 48 where it intersects the image 45' of the spot 45. This tangent HOT is representative of the terrestrial horizon. The looked-for absolute roll angle DELTA of the appliance is the angle formed between the horizon tangent HOT and the internal horizon line HOA of the image-capture appliance 1. It is calculated as such by processing the captured image.

The software also calculates the curvature angle of the frame 10. The curvature angle corresponds overall to the angle of the V-shape formed by the mean planes of the two rims (or of the two presentation lenses for rimless drilled-frame eyeglasses).

For this purpose, the software detects in the captured image the position of the end 34, 35 of each lateral head pointer 31, 32 and it calculates the horizontal distance between the end 34, 35 of the lateral head pointer 31, 32 under consideration and the base 90, 91 of the same head pointer. These respective offsets of the ends 34, 35 of the lateral head pointers 31, 32 away from the plane of symmetry PS are representative of the horizontal orientation angles of the lateral head pointers 31, 32, i.e. their orientations about the vertical. Since the lateral head pointers 31, 32 are secured to the shoes 28, 29 that are themselves oriented about the vertical to correspond with the mean plane of the respective rims 11 of the frame (or of the corresponding presentation lenses for rimless drilled-frame eyeglasses), the software can deduce from the positions of the ends 34, 35 of the lateral head pointers 31, 32 the orientation of each of the rims 11 of the frame about the vertical, and on that basis it can calculate the curvature of the frame.

Advantageously, the software may also perform anamorphosis corrections on the image that result from horizontal and vertical errors concerning parallelism between the image-capture plane PCI and the plane of the bracket 21, or in other words resulting from the fact that capture is not performed in an exact face view. For this purpose, the software may make use of the image of the central head pointer 30 to quantify the lack of parallelism between the central head pointer and the optical axis AO, and to deduce therefrom a matrix for correcting the anamorphosis of the image.

FIG. 10 shows a variant of the second embodiment of the device and of the second implementation of the measurement method of the invention. The measurement device is similar to that described above with reference to FIGS. 3 and 4 and the elements that are the same are given the same numerical references. Two main modifications have been applied: firstly the horizontal cross-member has been split into two horizontal cross-member elements 54 and 53 that can be spaced apart in adjustable manner, and secondly the position-identification accessory 20 has been provided with an artificial horizon device 60 making use of a pendulum device with two knife edges 70.

The position-identification accessory 20 may thus be adapted to the width of the eyeglass frame on which it is fastened. The two cross-member elements 54 and 53 extend in a plane that is substantially horizontal and they are themselves extended in a plane that is substantially vertical by two uprights 25 and 39 having downwardly-pointing ends. As in the embodiment shown in FIG. 3, two locking levers 22 and 23 are mounted on the ends of the uprights 25 and 39, and V-shaped shoes 26 & 28 and 27 & 29 that are provided with non-slip coatings are fitted respectively to the lever 22, to the horizontal cross-member 54, to the lever 23, and to the horizontal cross-member element 53. Lateral head pointers 31, 32 are mounted on the projecting portions 55, 56 of the horizontal cross-member elements 54, 53 to pivot about respective vertical axes A1 and A2 as in the embodiment shown in FIG. 3. The position-identification accessory 20 is fastened and the horizontal components of the orientations of the accessory are determined with the help of the head pointers 31 and 32 in the same manner as in the embodiment shown in FIG. 3.

In the variant of the position-identification accessory 20 described with reference to FIG. 10, the two transverse elements 53 and 54 present respective tapped bores opening out into their free ends so as to enable them to co-operate with a threaded rod 51. This threaded rod 51 is provided with a central knob 50 that is secured to the threaded rod. Turning the knob 50 serves to screw the threaded rod 51 into the tapped bore of each of the cross-member elements 53 and 54, or on the contrary to screw it out therefrom. This thus makes it possible to increase or reduce the length of the threaded rod 51 that extends between the two free ends of the horizontal cross-member elements 54 and 53. The total length of the position-identification accessory 20 along the common axis of the horizontal cross-member element can then advantageously be adjusted so that the shoes 26 & 28 and 27 & 29 are positioned vertically in register with the corresponding pupil of the wearer, substantially over or under the centers of the lenses carried by the eyeglass frame. This ensures that the angles measured by the device do indeed correspond to the pupil center point and are not falsified by faulty mounting of the position-identification accessory 20 on the eyeglass frame 10.

The artificial horizon device 60 is a variant of the bead device described above. It is carried by a support 60 having two horizontal side portions 61 and 62, four closure plates 81, 82, 83, and 84, and a projection 67. The two horizontal side portions 61 and 62 are of channel section and they receive the horizontal cross-member elements 53 and 54 so that the webs of the channel-section side portions rest thereon. The four closure plates 81, 82, 83, and 84 close these channel-section side portions around the cross-member elements 53 and 54. These plates are positioned on either side of the projecting portions 55 and 56 so as to define between them openings 64 and 63 in which the cross-member elements 53 and 54 can slide. The stroke of the cross-member elements 53 and 54 is limited by the projecting portions 55 and 56 coming into abutment against the closure plates 81 to 84. The projection 67 on the artificial horizon device 60 supports firstly a head pointer 30 provided with a contrasting mark 33 at its end, and secondly a pendulum with two knife edges 70.

The pendulum with two knife edges 70 comprises a frame 77 mounted to move about an axis A3 parallel to the common axis of the horizontal cross-member elements, by means of two fingers 75 resting in two V-shaped cradles 74 that are formed on the projection 67 on the axis A3. Within this frame 77, a square-base pyramid 73 with its point pointing downwards, towards the inside of the artificial horizon device 60, is mounted to pivot about the axis A4 via two fingers resting in two V-shaped cradles 78 of the frame 77. This pyramid is such that its center of gravity is situated beneath the axis of rotation A4, so that it is subjected to a gravity return effect similar to that described above for the bead artificial horizon. The fingers 75 of the frame 77 are placed in the cradles 74 by grooves 76 that enable the frame 77 to slide in the center of the projection 67. The pyramid 73 is put into place in the V-shaped cradles 78 formed in the frame 77 and it is held by a cover 71 closing the frame 77. A rod 72 is fastened to the base of the pyramid 73 and points upwards. The two degrees of freedom of the rod 72 ensure that it remains substantially vertical. The orientation of this rod 72 thus serves to identify the vertical axis in the captured images of the position-identification accessory 20. The angle between the rod 72 and the front face of the frame 77 thus provides information about the angle of inclination of the position-identification accessory 20 about the axis A4, i.e. the tilt angle. The angle of inclination of the position-identification accessory 20 about the axis A3, i.e. the roll angle, can be estimated by measuring the height of the front face of the frame 77 relative to the two lateral portions 61 and 62.

The position-identification accessory 20 carries five contrasting marks. In addition to those described with reference to FIG. 3, the mark 33 carried by the head pointer 30, and the marks 46 and 47 carried by the vertical uprights 25 and 26, and two other marks 65 and 66 are situated at the ends of the support elements 62 and 63 on either side of the horizontal cross-member elements 54 and 53, on their front faces (substantially perpendicular to the sagittal plane PSAG). The respective positions in three dimensions of the marks 33, 46, 47, 65, and 66 constitute known geometrical characteristics that are stored as constant parameters in the calculation software installed on the computer 8.

The present invention is not limited in any way to the embodiments described and shown, and the person skilled in the art knows how to make any variation thereto within the spirit of the invention.

In particular, provision could advantageously be made for the device and the method to be designed to operate with Frankfurt's plane at an orientation that is not parallel to the terrestrial horizon plane. Under such circumstances, it suffices to measure the angle of inclination of Frankfurt's plane relative to the terrestrial horizon and to correct the tilt angle ALPHA and the absolute observation angle GAMMA as a function of said angle of inclination. In particular, provision can be made for the processing and calculation software to deduce an expected head position of the wearer from the absolute sighting angle formed by the gaze direction (or line of sight DV) relative to the horizontal during image capture, with account being taken of a behavioral correlation taken from a generic table or from personalized behavior analysis of the wearer in question.

Although in the above examples the absolute observation vertical angle is measured from the measurement of the tilt angle of the image-capture appliance, provision may also be made for the absolute observation vertical angle to be measured from a measurement of the altitude of the image-capture appliance, at least relative to the head of the wearer. Under such circumstances, measurement means, such as for example a measurement system of the type sold by the supplier Polhemus or any other telemetry system making use of ultrasound, a laser, triangulation, a rangefinder, or the like, are provided for measuring the vertical position of the image-capture appliance, and these means take the place of the tilt meter or the artificial horizon as used in the examples described above since they are superfluous in this example.

More generally, provision can be made for the software to measure from a single image captured in front view, the position and the orientation of the image-capture appliance, in particular its vertical angle of inclination (tilt) and/or its horizontal angle of inclination (roll), by measuring the deformation associated with perspective and concerning at least one known article present in the field of view of the image-capture appliance. For example, mutually parallel lines (typically vertical and/or horizontal lines) are positioned behind the wearer, and the software measures the angle between the images of these lines in the captured image, thereby making it possible to deduce the vertical inclination of the image-capture appliance. For example, the vertical lines remain parallel in the image only when the vertical angle of inclination (tilt) of the appliance is zero.

In the example shown, the pair of eyeglasses is of the rimmed type, i.e. the lenses are mounted in the rims of the frame. In a variant, the presentation pair of eyeglasses may be of the drilled type, i.e. the lenses are drilled and each lens is fastened by means of the drill holes made in this way to one end of a nose bridge and to one end of the corresponding temple of the frame. The method described may also be applied to such a pair of eyeglasses of the drilled type. Under such circumstances, the position-identification accessory is fastened directly on the corresponding presentation lens. The calculations or measurements performed on the rims (shape, orientation) in the above description are then performed on the presentation lenses mounted on the drilled type frame.

In the example shown, the system for performing processing and calculation on the acquired image consists in a microcomputer having software installed thereon for processing and calculating the acquired image. In a variant, provision could be made for the processing and calculation system to be an independent system having firstly a display screen for communicating the results it obtains, and secondly connection means enabling it to communicate these results with other appliances. With a self-contained processor system, provision may also be made for the system to be optionally incorporated in the image-capture means.

Finally, the order in which the steps are performed is not limiting on the invention and the person skilled in the art is able to modify the order at will while ensuring that the method as a whole continues to be functional.

The invention claimed is:

1. A method of measuring at least one geometrico-physiognomic parameter (H, TETA) for positioning a vision-correcting eyeglass frame (10) on the face of a wearer for personalized calculation and/or mounting of corrective lenses associated with said frame, including a step of using an image-capture appliance (1) to capture a digital image substantially in front view of the wearer's face wearing at least the frame (10), and a step of calculating the geometrico-physiognomic parameter (H, TETA) on the basis of processing the captured image, the method being characterized in that the calculation of the geometrico-physiognomic parameter (H, TETA) includes identifying, in the image, the image of a predetermined remarkable point (RC) that is directly or indirectly associated with the wearer's face or with the frame, and it takes into consideration a magnitude representative of the absolute vertical angle of observation (GAMMA) formed between firstly an observation line (DO) connecting the pupil (7) of the image-capture appliance (1) to the remarkable point (RC), and secondly its projection onto a horizontal plane (PF).

2. A method according to claim 1, wherein the image-capture appliance (1) is a hand-held appliance held by an operator during image capture.

3. A method according to claim 1, wherein, in order to measure the absolute vertical angle of observation (GAMMA), a tilt angle (ALPHA) is measured as formed between the optical axis (AO) of the image-capture appliance (1) and its projection on the horizontal plane (PF).

4. A method according to claim 3, wherein the measurement of the tilt angle (ALPHA) is provided by a tilt meter fitted to the image-capture appliance and adapted to deliver a signal representative of the value taken by the tilt angle (ALPHA) at the moment of image capture.

5. A method according to claim 3, wherein, prior to image capture, an artificial horizon device (40) is fitted to the wearer's head (TP), the device including a horizon-reference element (41) that is movable in rotation about an axis (42) perpendicular to the sagittal plane (PSAG) and that is adapted to conserve a constant position relative to the horizontal plane (PF), said horizon-reference element having a known geometrical characteristic, and wherein after image capture, the image of said horizon-reference element (41) is identified in the captured image, a geometrical characteristic (Ev) of the image corresponding to the known geometrical characteristic of said horizon-reference element is measured, and the tilt angle (ALPHA) is calculated as a function of the measured geometrical characteristic of the captured image and of the known geometrical characteristic of the horizon-reference element.

6. A method according to claim 5, wherein the calculation of the tilt angle (ALPHA) is also a function of a reference relative observation angle (OMEGA) formed between firstly an observation line (DOB) passing through a point of the horizon-reference element (41) and the pupil (7) of the image-capture appliance (1), and secondly the optical axis (AO) of the image-capture appliance (1), said relative observation angle (BETA) being deduced from the measurement of the off-center shift of the image in the captured image of the horizon-reference element (41) relative to an image center associated with the optical axis (AO) of the image-capture appliance (1).

7. A method according to claim 3, wherein, in order to measure the absolute vertical observation angle (GAMMA), the tilt angle (ALPHA) is combined with a relative observation angle (BETA) formed between the observation line (DO) and the optical axis (AO) of the image-capture appliance (1), said relative observation angle (BETA) being deduced from measuring the off-center shift in the captured image of the image of the remarkable point (RC) of the eye relative to an image center associated with the optical axis of the image-capture appliance (1).

8. A method according to claim 3, wherein, in order to measure the absolute vertical observation angle (GAMMA), arrangements are made such that while capturing the image, the image-capture appliance (1) is oriented so that the remarkable point (RC) is centered on a centering mark of the viewfinder system of the image-capture appliance (1), the absolute vertical observation angle (GAMMA) then being equal to the tilt angle (ALPHA).

9. A method according to claim 1, wherein, in order to measure the absolute vertical observation angle (GAMMA), an altitude of the image-capture appliance (1) is measured, at least relative to the wearer's head.

10. A method according to claim 1, wherein the geometrico-physiognomic parameter includes the height (H) of a remarkable point (PU) of the eye relative to the frame and/or the pantoscopic angle of inclination (TETA) formed by the general plane of the frame or of the lens (PM) relative to the vertical.

11. A method according to claim 1, wherein a pantoscopic position-identification element (30, 33, 36, 38) is placed on the frame, which element possesses at least one known geometrical characteristic and is placed in such a manner that the front-view image captured by means of the image-capture appliance (1) incorporate an image of the pantoscopic position-identification element (30, 33, 36, 38), and wherein, the image of the position-identification element (30, 33, 36, 38) being processed to measure therefrom a geometrical characteristic depending on the known geometrical characteristic, the calculation of the geometrico-physiognomic parameter is a function of the measured geometrical characteristic and of the known geometrical characteristic of the position-identification element.

12. A method according to claim 1, wherein the geometrico-physiognomic parameter (H, TETA) is calculated taking account of a scale factor that, in the image-capture configuration, gives the proportionality ratio between a real dimension of a geometrical element for which an image is captured and the number of pixels in the image of said element in the direction of the dimension under consideration.

* * * * *

UNITED STATES PATENT AND TRADEMARK OFFICE
CERTIFICATE OF CORRECTION

| | | |
|---|---|---|
| PATENT NO. | : 7,950,800 B2 | Page 1 of 1 |
| APPLICATION NO. | : 12/596351 | |
| DATED | : May 31, 2011 | |
| INVENTOR(S) | : Michel Nauche et al. | |

It is certified that error appears in the above-identified patent and that said Letters Patent is hereby corrected as shown below:

In column 6, line 27, please amend "therewith out" to read -- therewith without --

Signed and Sealed this
First Day of November, 2011

David J. Kappos
*Director of the United States Patent and Trademark Office*